United States Patent [19]

Haug

[11] 3,839,921
[45] Oct. 8, 1974

[54] TRACK SPROCKET, PARTICULARLY FOR SNOW VEHICLES
[75] Inventor: Walter Haug, Blaustein, Germany
[73] Assignee: Karl Kassbohrer Fahrzeugwerke GmbH, Ulm/Donau, Germany
[22] Filed: Feb. 21, 1973
[21] Appl. No.: 334,232

[30] Foreign Application Priority Data
Feb. 23, 1972  Germany............... 2208600

[52] U.S. Cl............................................ 74/243 R
[51] Int. Cl............................................ F16h 55/30
[58] Field of Search...................... 74/243 R, 243 PC

[56]  References Cited
UNITED STATES PATENTS
1,695,529  12/1928  Brownyer........................ 188/218
3,483,766  12/1969  Erickson.......................... 74/243 R
3,610,066  10/1971  Rychlik............................ 74/243 R Primary Examiner—Leonard H. Gerin
Attorney, Agent, or Firm—Woodhams, Blanchard & Flynn

[57]  ABSTRACT

A track sprocket particularly for snow vehicles. In a track sprocket drive assembly particularly for snow vehicles there is provided a sprocket construction which is adaptable for mounting closely adjacent driving means and for receiving braking means within the sprocket. A portion of the sprocket rim functions as the brake drum to shorten the length of the overall assembly and to remove the previously existing need for placing the drum mechanism within or adjacent to the drive means. The entire sprocket is covered with a non-abrasive plastic material and hence the disc and rim portions of the sprocket are provided with tooth cores of such shape as they can be readily made by simple casing procedures. Similarly the wheel disc and rim may thereafter be easily covered with plastic by likewise simple molds and/or injection tooling.

9 Claims, 5 Drawing Figures

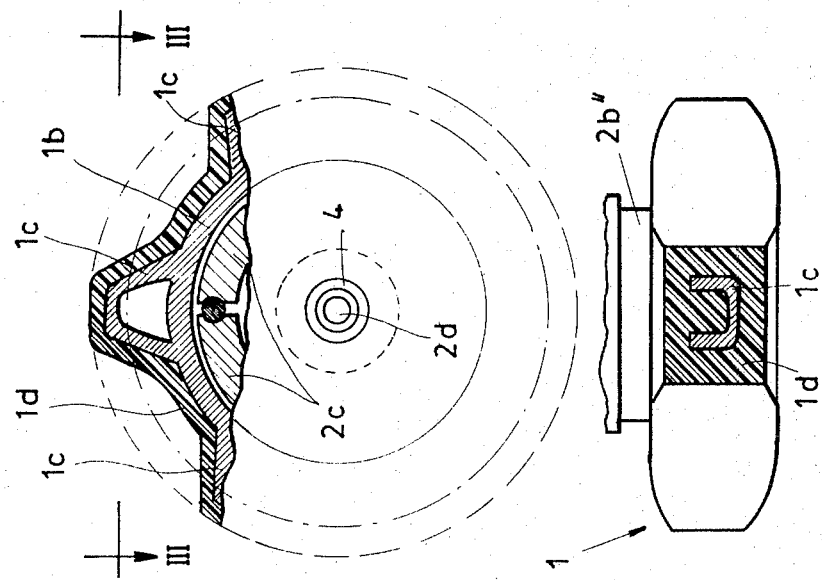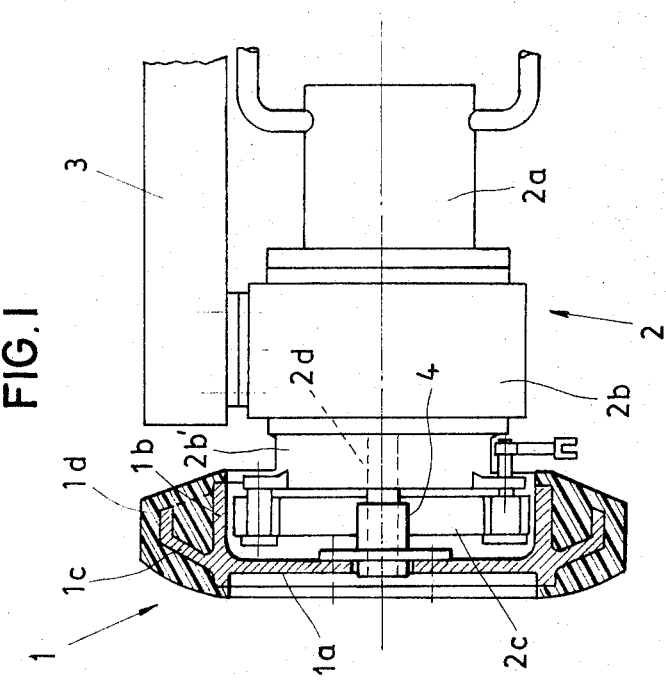

TRACK SPROCKET, PARTICULARLY FOR SNOW VEHICLES

The invention relates to a track sprocket, particularly for snow vehicles, comprising a wheel having a disk and a rim, said rim is provided with peripheral teeth and wear surfaces which are formed from a nonabrasive plastic.

A sprocket of the general type above mentioned is already known and has a one-piece cast wheel member with potlike hollow teeth which are externally covered by a nonabrasive plastic of at least approximately the same wall thickness throughout all or almost all of the surface involved. This known track sprocket is uneconomical to manufacture because, on one hand, of the complicated multiply divided molds, particularly cores required for the castings because of the hollow tooth construction and on the other hand, because of the substantially constant wall thickness of the nonabrasive plastic coating, the coast tooth mold determines the final shape and size of the wear surfaces on the teeth and hence the casting tolerances must be held very small. Furthermore, where the sprocket is intended to function also as a driving wheel, there is an uneconomical increase in the manufacturing costs and a disadvantageous enlargment of the installation space needed for the driving mechanism thereof. For this purpose the known track sprocket is advantageously associated with a known driving mechanism which consists of a coaxially flanged-together hydraulic motor gear box complex, with a bearing shield through which extends its driven shaft and a drum brake. In order to maintain the bending moment which acts onto the driven shaft as small as possible, the known track sprocket must be arranged as close as possible to the bearing shield and this forces the drum brake to be within the hydraulic motor gear box complex. Thus, as mentioned above, its construction costs and axial dimensions are increased.

The basic purpose of the invention is to produce a track sprocket of the type mentioned above which is less expensive to manufacture than those manufactured up to now and permits a space-saving economical construction of an associated driving mechanism. This is attained by constructing the rim with a cylindrical inner surface as a brake drum.

Many advantages are obtained from this simple arrangement. The great radial pressure resistance of the brake drum permits it to carry the teeth of the rim on thin-walled and, hence material saving, parts and to support the tooth means by a single radial web inherently stable against the outer surface of the brake drum. Its cylindrical inner surface permits, in connection with the individual web profiling of the rim teeth and the avoidance of back tapers of the wheel cross section in axial direction resulting therefrom, a one-piece manufacture of the wheel member with simple molds or injection tooling. This assures an economical lowering of the production costs for the track sprocket, which is at the same time capable of fulfilling the function of the brake drum of a brake mechanism. The drum diameter thereof can be selected substantially larger than in the known drum arrangement on the axle and thus assures a substantially higher braking effect than has been previously possible.

In this connection it is particularly advantageous if the wheel member is constructed with sufficient rigidity and of such a cross section that it can be mounted fixedly with respect to rotation indirectly or directly on a driven shaft of a conventional driving mechanism which consists of a coaxially flanged-together hydraulic motor gear box complex with a bearing shield through which extends the driven shaft and a drum brake for a track driving wheel both with the function of a driving wheel and also with the function of a brake drum for the brake shoes which are arranged immediately outwardly of the bearing shield. With such a driving sprocket, the driving mechanism therefor can be manufactured economically because the brake arrangement is no longer required to be within the hydraulic motor gear box complex and hence same is axially shortened for resulting space saving and lower construction costs. Further, with the brake shoes arranged in the invention on the outside on the bearing shield, same are freely accessible for service and repair purposes after the removal of the driving sprocket.

With respect to the above mentioned profiling of the rim, it is advantageous if its teeth are constructed in the diametric cross section as a T-, or L-shape and in a plane tangent to a medium tooth circle, a double T- or U-shaped profile. Such tooth profiling permits the use of only two-part molds or injection tooling.

The invention will be discussed more in detail hereinafter, including further structural details, in connection with the accompanying drawings, in which:

FIG. 1 is a schematic radial cross-sectional view of a track sprocket of the aforedescribed type with an associated drive mechanism;

FIG. 2 is a schematic and partially cross-sectional elevation view of the track sprocket according to FIG. 1;

FIG. 3 is a schematic cross-sectional view along the line III—III of FIG. 2;

Figure 5:
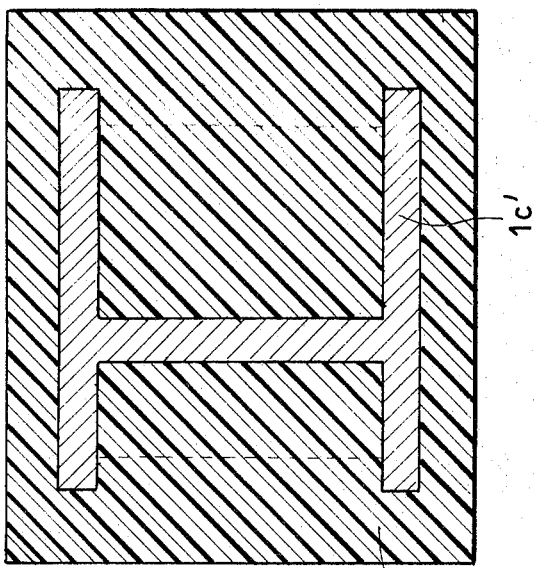
FIG. 5 is a schematically illustrated cross-sectional view along the line V—V of FIG. 4.

A track sprocket 1 according to FIGS. 1 to 3 consists of a wheel member of a one-piece construction with a wheel disk 1a and a rim 1b with spur gear teeth 1c. The wear surfaces of the wheel member 1, particularly the teeth 1c, are made of a nonabrasive plastic 1d which, as best shown in FIG. 1, covers the teeth of the rim 1b.

The rim 1b of the wheel member 1 is constructed with its cylindrical inner surface as a brake drum.

In the exemplary embodiment of FIG. 1, the wheel member 1 is associated with a driving mechanism 2 of a track vehicle of which only a frame portion 3 is illustrated. The driving mechanism 2 has in a conventional manner a gear box 2b, for example a planetary gear. Said gear box is flanged together coaxially with a hydraulic motor 2a, a drum brake with brake shoes 2c and a bearing shield 2b' on the driven side of the gear box, a driven shaft extending rotatably through said bearing shield.

The wheel member 1 is so constructed with sufficient mechanical rigidity, and particularly of such a cross section, that it can be mounted directly on the driven shaft 2d of the hydraulic motor gear box complex 2 or, as in the exemplary embodiment, fixed for rotation therewith through a hub 4. It then functions both as a driving wheel for a not illustrated track of the vehicle and it also functions as a brake drum for the brake shoes 2c of the drum brake, said brake shoes being arranged on the outside on the bearing shield 2b'.

The drawing disloses further that the teeth 1c of the rim 1b are constructed in the diametric cross-sectional view of FIG. 1 with a L-shaped profile and in a cross-sectional view taken approximately tangentially to the median tooth circle with a U-shaped profile and free of back tapers in the direction of the wheel axis.

The cross-sectional profiles of the teeth 1c are embedded in the nonabrasive plastic 1d which also fills the profile openings and thus forms wear surfaces on the tooth surfaces.

Figure 4:
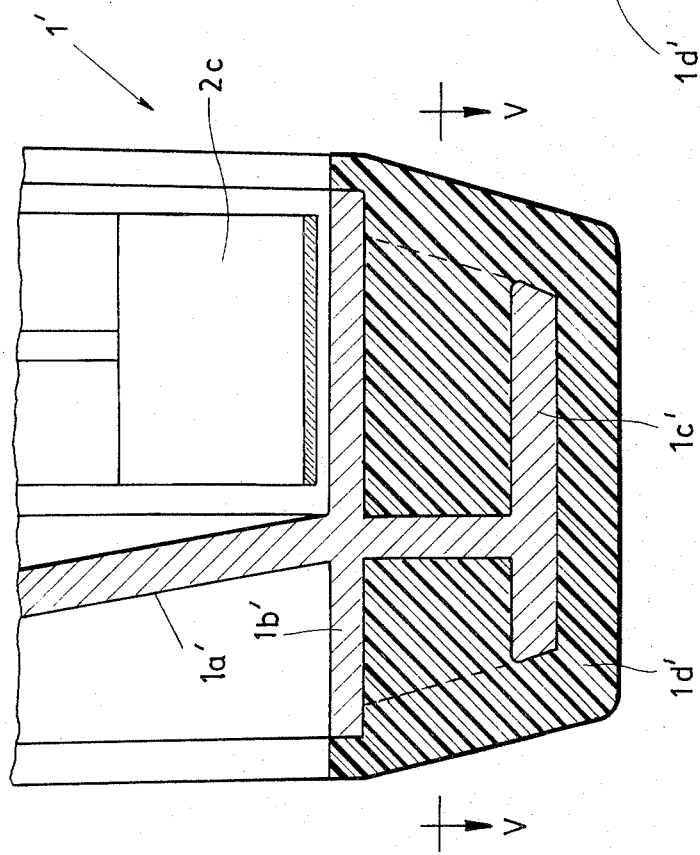
FIG. 4 is an enlarged schematically illustrated radial cross-sectional view of a portion of a modified embodiment of a track sprocket.

FIGS. 4 and 5 illustrate a wheel member 1' with a conically or dishlike, outwardly extending wheel disk 1a'. Said wheel disk is also constructed integrally with a rim 1b' and teeth 1c' arranged thereon. The latter have in a radial cross-sectional view according to FIG. 4 a T-shaped profile and in a cross-sectional view taken on a plane approximately tangent to the median tooth circle an approximately double T-shaped profile, neither having back tapers in the direction of the wheel axis.

These cross-sectional profiles are also embedded in a non-abrasive plastic 1d' which forms the wear surfaces of the wheel member 1' and also fills the profile openings of the teeth 1c'.

The invention, particularly with respect to the particular tooth profiles, is not limited to the embodiments illustrated in the drawings. It would also be conceivable to construct the wheel disk 1a conically, or dish-shaped, in an outwardly extending manner like the wheel disk 1a' and/or to connect the latter in the same manner as the wheel disk 1a to the front edge of the tooth rim 1b'.

The embodiments of the invention in which an exclusive property or privilege is claimed are defined as follows:

1. In a track sprocket, particularly for snow vehicles, comprising a disk-shaped wheel member having a rim with peripheral teeth thereon and wear surfaces which are formed by nonabrasive plastic, the improvement comprising said toothed rim having a cylindrical inner surface defining a cylindrical brake drum, a sufficiently rigid mounting and cross section construction of said disk-shaped wheel member, said wheel member being fixedly mounted with respect to rotation indirectly or directly on a driven shaft of a conventional driving mechanism consisting of a coaxially coupled together hydraulic motor gear box complex with a bearing shield through which extends said driven shaft and brake shoes mounted on said bearing shield adapted to engage said cylindrical brake drum.

2. The improvement according to claim 1, wherein said disk-shaped wheel is constructed in an outwardly extending conical shape.

3. The improvement according to claim 1, wherein said disk-shaped wheel is connected to an edge zone of said toothed rim.

4. The improvement according to claim 1, wherein front edge of said toothed rim are covered by said nonabrasive plastic.

5. The improvement according to claim 1, wherein said teeth on said toothed rim have one of a T-shaped and L-shaped construction in a radial cross section and one of a double T-shaped and U-shaped profile in a plane tangent to the pitch circle.

6. The improvement according to claim 5, wherein the cross-sectional profiles of the teeth are embedded in the nonabrasive plastic.

7. The improvement according to claim 6, wherein the profile openings of the tooth cross-sectional profiles are filled with the nonabrasive plastic for forming of wear surfaces which face away from the profile ribs.

8. The improvement according to claim 5, wherein the tooth profiles are constructed free of back tapers in the directions of the wheel axis.

9. In a toothed track sprocket, particularly for snow vehicles, having a wheel member composed of a disk-shaped wheel and a toothed rim on the outer periphery thereof which has wear surfaces formed by wear-resistant plastic, the improvement comprising said toothed rim having a cylindrical inner surface defining a cylindrical brake drum, the teeth on said toothed rim each extending in a radially outward direction and having one of a T- and L-shaped profile in a radial section through the axis of said disk-shaped wheel and one of a double T- and U-shaped profile in a plane tangent to a pitch circle, each of said profiles on said toothed rim being completely embedded in said wear-resistant plastic.

* * * * *